(12) United States Patent
Meinzinger et al.

(10) Patent No.: US 8,920,151 B2
(45) Date of Patent: Dec. 30, 2014

(54) METHOD AND DEVICE FOR INSTALLING AND/OR REMOVING BLOW MOULDS

(75) Inventors: Rupert Meinzinger, Kirchroth (DE); Konrad Senn, Regensburg (DE); Thomas Albrecht, Beilngries (DE)

(73) Assignee: Krones AG, Neutraubling (DE)

( * ) Notice: Subject to any disclaimer, the term of this patent is extended or adjusted under 35 U.S.C. 154(b) by 292 days.

(21) Appl. No.: 12/871,144

(22) Filed: Aug. 30, 2010

(65) Prior Publication Data
US 2011/0057342 A1    Mar. 10, 2011

(30) Foreign Application Priority Data

Sep. 2, 2009    (DE) .......................... 10 2009 039 695

(51) Int. Cl.
*B29C 49/48*    (2006.01)
*B29C 33/26*    (2006.01)
*B29C 49/06*    (2006.01)
*B29L 31/00*    (2006.01)

(52) U.S. Cl.
CPC ............. *B29C 49/48* (2013.01); *B29C 33/26* (2013.01); *B29C 49/06* (2013.01); *B29C 2049/4856* (2013.01); *B29C 2049/4864* (2013.01); *B29C 2049/4889* (2013.01); *B29L 2031/7158* (2013.01)
USPC ............. 425/186; 29/401.1; 29/426.1; 425/3; 425/195; 425/522; 425/541

(58) Field of Classification Search
CPC ............... B29C 2049/4856; B29C 2049/4858; B29C 2049/4866; B29C 2049/5893

USPC ............ 425/3, 182, 186, 195, 522, 540, 541; 29/401.1, 426.1
See application file for complete search history.

(56) References Cited

U.S. PATENT DOCUMENTS

| | | | | |
|---|---|---|---|---|
| 2,348,347 | A * | 5/1944 | Koob | 65/261 |
| 2,756,885 | A * | 7/1956 | Ackermann | 414/661 |
| 2,925,929 | A * | 2/1960 | Romine | 414/661 |
| 5,232,716 | A * | 8/1993 | Seto et al. | 425/185 |
| 6,655,268 | B2 * | 12/2003 | Comley et al. | 100/319 |
| 2007/0269545 | A1 * | 11/2007 | Ellis et al. | 425/3 |
| 2009/0178264 | A1 * | 7/2009 | Stoiber | 29/401.1 |
| 2011/0052744 | A1 * | 3/2011 | Meinzinger et al. | 425/183 |

FOREIGN PATENT DOCUMENTS

| | | |
|---|---|---|
| AT | 009 438 U1 | 10/2007 |
| DE | 36 13 543 C1 | 12/1986 |
| EP | 0 893 221 A2 | 1/1999 |
| JP | 10-180813 A | 7/1998 |
| WO | 2006/113428 A2 | 10/2006 |

OTHER PUBLICATIONS

Partial machine translation of DE 3613543 C1 dated Dec. 1986 obtained from the esp@cenet website.*
International Search Report for EP 10 17 4578, mailed Jan. 14, 2011.

* cited by examiner

*Primary Examiner* — Robert B Davis
(74) *Attorney, Agent, or Firm* — Novak Druce Connolly Bove + Quigg$^{LLP}$

(57) ABSTRACT

A method for removing blow molds from a forming device for transforming plastic preforms into plastic containers may include arranging a multi-piece blow mold on a blow mold carrier. The method may include separating the blow mold in at least partly assembled state from the blow mold carrier.

21 Claims, 4 Drawing Sheets

METHOD AND DEVICE FOR INSTALLING AND/OR REMOVING BLOW MOULDS

CROSS-REFERENCE TO RELATED APPLICATION

This application claims the benefit of priority of German Patent Application No. 10 2009 039 695.0, filed Sep. 2, 2009, pursuant to 35 U.S.C. 119(a)-(d), the disclosure of which is incorporated herein by reference.

TECHNICAL FIELD

The present disclosure relates to a forming device for transforming plastic preforms into plastic containers and a method for installing/removing the associated blow moulds.

BACKGROUND

Forming devices have been known for some time in the prior art, such as for example blow-moulding devices which transform plastic preforms into plastic containers. To this end such devices normally have so-called blow moulds which can be folded together and in their interior form a cavity which serves for expansion of a plastic preform against the walls of the cavity in order thus to produce plastic containers.

These blow moulds therefore usually have two blow mould halves which are arranged in corresponding blow mould carriers.

If a corresponding device is to be converted to different bottle types, for this the blow moulds must be removed from the mould carriers and replaced with other blow moulds. This process is relatively time-intensive since, in particular for a multiplicity of blow stations, each individual blow mould must be removed from its carrier.

For this reason the prior art discloses various coupling mechanisms which allow separation of the blow moulds from their carriers as quickly as possible. Such quick-release mechanisms partly allow very rapid exchange of the blow moulds concerned. Nonetheless faster possibilities for this blow mould change are always sought.

It may therefore be desirable to develop a faster method of fitting/removal of such blow moulds. It may also be desirable to perform such blow mould changes automatically where applicable.

SUMMARY OF INVENTION

According to various aspects of the disclosure, a method for removal of blow moulds from a forming device for transforming plastic preforms into plastic containers may comprise at least one blow mould carrier and a multi-piece blow mould arranged in this blow mould carrier. According to the disclosure, the blow mould is separated from the carrier— preferably formed as multi-piece—in at least partly assembled state.

Whereas, in the prior art, previously normally the blow mould carriers with the blow mould halves were opened and then separately the two blow mould side parts were detached from the mould carrier, according to the disclosure it is proposed to remove the blow mould in its entirety from the carrier. This means that at the time of removal from the carrier, the individual blow mould parts are firmly connected together so that one single handling instrument is sufficient to perform removal. Furthermore it is however also conceivable that at the time of removal, the individual blow mould parts are not linked together. Nonetheless the process is synchronised so that the blow mould parts can be removed from the mould carrier at about the same time. Furthermore it is also conceivable that only individual parts of the multi-piece blow mould are linked together at the time of removal. The central point is then again the removal of the blow mould parts from the mould carrier at about the same time. With this procedure the change times for removal of the blow moulds can be reduced.

It is pointed out that the method according to the disclosure can also be used correspondingly for the mounting of blow moulds, in that a blow mould in at least partly assembled state is connected with the blow mould carrier.

Due to the procedure according to the invention, it is also possible to use the opening procedure of the blow mould carriers required during the working mode of the device, to remove the blow moulds from the carriers.

In exemplary embodiments of the method, in a first method step the blow mould is separated from the blow mould carrier and then the blow mould in at least partly assembled state is removed from the forming device.

The term 'at least partly assembled state' here means that at least two parts of this blow mould are substantially joined together. For example these can be two side parts of the blow mould which together surround a cavity for transforming the plastic preforms into plastic containers and which are substantially joined. The term 'substantially joined' again means that the two side parts need not necessarily lie completely against each other as is the case for example in working mode, but for example a gap can be provided between the side parts, wherein however there is at least an indirectly achieved link between the two parts of the blow mould.

In some exemplary methods the blow mould has two blow mould halves and these blow mould halves are attached to each other with a holding means while the blow mould halves are removed from the blow mould carrier. This can be a holding means which is arranged on the two halves of the blow mould and joins these together. It could however also be holding means which for example are arranged in the floor of a device and on which the two blow mould halves sit. With this procedure the blow mould carriers can be opened and then the blow mould removed from the forming device.

In some exemplary embodiments the blow mould has a base part and this base part is preferably attached to at least one of the blow mould halves while the blow mould is separated from the blow mould carrier. In some aspects, the two blow mould halves have recesses which hold the base part and for example clamp it between them. Thus it is possible for the base part to be arranged on both blow mould halves and in particular suspended in both blow mould halves.

In some exemplary methods the blow mould halves are locked to the base part such that the mould carrier when opened detaches from the blow mould halves. Thus it can be provided that in a special assembly or removal operation of the forming device, first a lock between the mould carrier and the blow mould is opened and then the blow mould carriers are opened and finally the blow mould removed.

In some exemplary methods, after separation from the blow mould carrier, the blow mould is transported by means of a transport device. This contributes to automation of the blow mould change in that not only is the blow mould removed from the mould carriers in assembled state but it is then transported away by a transport device.

According to various aspects, the blow mould is transported in a gripper or holder element which also serves for transport of the containers. Thus it is possible for the same holder elements and transport routes to be used for removal of the blow moulds as also serve in working mode for transport of the containers. In this way further automation and simplification of the system can be achieved.

The method can also be applied if the structure of a blow station has an outer mould carrier, a centre parent mould and an inner blow mould. The method according to the disclosure then comprises both removal of the blow mould parts from the blow mould carrier and the associated parent mould, and removal of the parent mould and blow mould parts from the blow mould carrier.

The present disclosure is therefore also directed at a method for mounting and/or removing blow moulds in or from devices for transforming plastic preforms into plastic containers, wherein the blow mould in at least partly assembled state is transported by means of a transport device along a transport path predetermined by the transport device.

In some aspects, the transport device is a transport device which is also used for transporting the plastic preforms and/or plastic containers. In some aspects, the blow mould is transported at least partly on a circular transport path. Thus it is possible for the blow mould to be supplied for mounting on the blow mould carrier via an input star and/or transported away from a blow mould carrier via an output star.

The present disclosure is furthermore directed at a moulding device for transforming plastic preforms into plastic containers with a multi-piece blow mould, wherein this blow mould forms a cavity within which the plastic preforms can be expanded into plastic containers. Furthermore the forming device comprises a blow mould carrier on which the blow mould can be detachably arranged.

According to the disclosure a holding means is provided which attaches together at least two parts of the blow mould in a state separated from the blow mould carrier.

Also according to the device it is therefore provided that in particular the blow mould is designed such that the blow mould can be removed from the plant in an at least partly assembled state after separation from the blow mould carrier. It is also proposed that the blow mould can be transported in this state. In some aspects, the blow mould comprises at least two side parts and a base part. The holding means in this state may serve to ensure that the blow mould can be removed and transported in its entirety i.e. the side parts and the base part.

This holding means can for example be a gripper means which clamps the two blow mould parts together. Also magnetic means can be provided in the blow mould halves which hold the two blow mould halves together by magnetic force. In particular the blow mould carrier has at least two carrier halves which can swivel in relation to each other, wherein each carrier half may contain a side part of the blow mould.

The blow mould halves are in some aspects arranged symmetrically to each other. It is also possible for the blow mould halves to serve for common holding of a further parent mould within which the plastic preforms are expanded into plastic containers.

In normal working mode, the two blow mould halves are folded together only for expansion of the containers but are otherwise completely separated from each other. Also the holding means according to the invention allows removal of the blow mould as a whole from the blow mould carrier.

In some exemplary embodiments the blow mould carrier is connected with the blow mould via a—for example, automatically—releasable connecting mechanism. Thus in the case of dismantling, first this connecting mechanism is released in order then to remove the blow mould. In the case of assembly, first the blow mould is placed between the blow mould carriers and then the releasable connecting mechanism is locked to arrange the two blow mould halves in the carrier.

In some exemplary embodiments the two parts of the blow mould are attached directly to each other with the holding means.

In some exemplary embodiments the blow mould can be attached to a holding element which serves to transport the containers in working mode. Thus it is possible for example for the blow mould to be arranged on the holder element by magnetic forces.

In some exemplary embodiments however a holding piece is provided which can be brought into connection both with the blow mould and with a holder element which serves to transport the containers in working mode. Thus a holding piece can be provided which is introduced into a mouth region of the blow mould and cannot be removed from this as long as the two blow mould halves are connected together. The other end of this holder piece could be designed so that it can be held by a holding element of the plant. In this way the transport devices already provided can be used to transport away the blow mould itself. In some aspects the holding piece is formed as one piece.

In some exemplary embodiments the holding piece can be brought into engagement with two parts of the blow mould to hold the blow mould. Thus it is possible for this holding piece as stated to be held between the two blow mould halves and in this case can no longer be withdrawn.

The present disclosure is furthermore directed at a blow mould for transforming plastic preforms into plastic containers with a first side part and a second side part, wherein the first side part and the second side part in assembled state surround a cavity within which the plastic preforms can be expanded into plastic containers.

According to the disclosure the blow mould has a connecting device which attaches the first side part to a second side part, wherein one element is connected with the first side part and a further element is connected with the second side part so that the blow mould can be transported in a closed state.

In particular the blow mould can be transported in a state separated from the mould carriers. Furthermore in particular the blow mould can also be transported independently of the mould carriers and in particular in a state separated from the mould carriers. Furthermore the blow mould can be transported on any arbitrary path, in particular independently of the machine or forming device.

The above mentioned objects may be achieved with a blow mould formed in this way since the blow mould as a whole can be removed from the blow mould carrier. In particular the blow mould is formed so that it can be held by a blow mould carrier and locked on this. In some aspects, the blow mould is formed symmetrical. Furthermore the blow mould has connections for transporting a liquid medium such as in particular a tempering medium. These connections can in some aspects also be coupled to corresponding connections on the blow mould carrier.

The present disclosure is furthermore directed at a holding piece which has a first holding section that can be brought into connection with a closed blow mould and a second holding section that can be gripped by a holding element and in particular a gripper element which serves to hold containers.

In various aspects, this holding piece has an engagement means which penetrates into an inner cavity of the blow mould and which at least in sections has a greater cross-section than the neck section of this blow mould. In this way the holding piece cannot be separated from the blow mould. It would however also be possible for the holding piece to have an engagement means which engage on an outer periphery of two side parts of the blow mould in order to hold these two side parts together.

Some further advantages and embodiments may become evident from the attached drawings.

DETAILED DESCRIPTION

Figure 1:
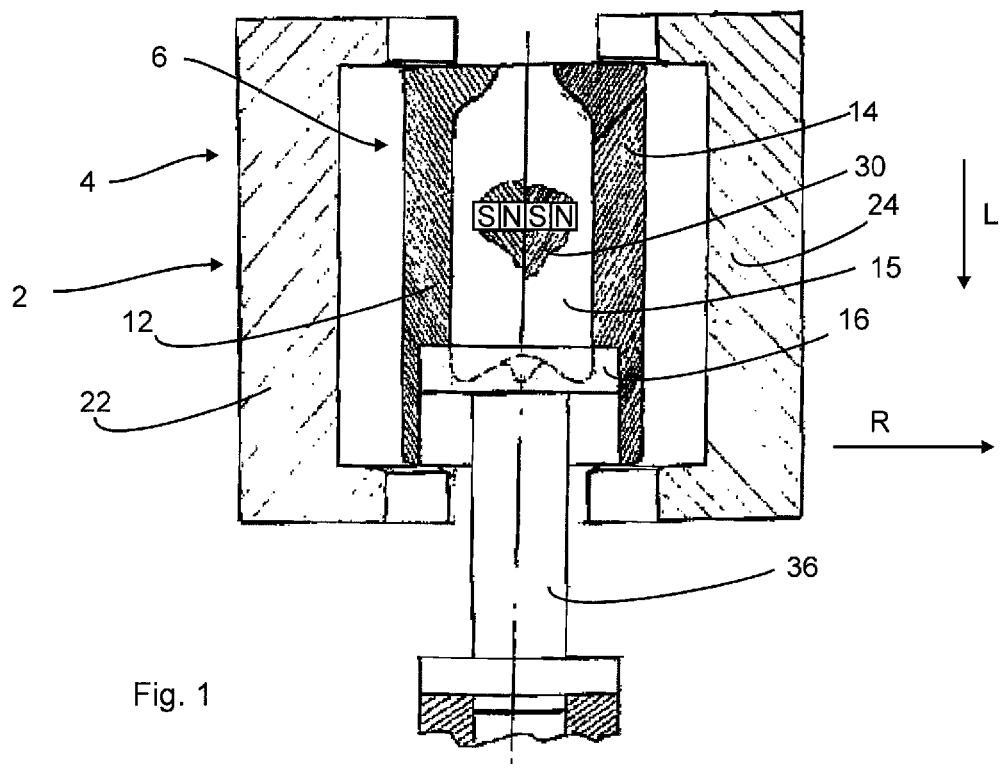
FIG. 1 shows a diagrammatic view of a blow mould carrier with a blow mould.

FIG. 1 shows a rough diagrammatic view of a blow station 2. This blow station 2 here has a blow mould carrier as a whole designated 4. This blow mould carrier has two carrier halves 22 and 24 which in working mode hold the blow mould. More precisely, the blow mould 6 also comprises two blow mould parts or halves 12 and 14, wherein the first blow mould half 12 is attached to a first carrier half 22 and a second blow mould half 14 to a second carrier half 24. A corresponding fixing mechanism is not however shown in FIG. 1.

Furthermore the blow mould 6 has a base part 16 which together with the two blow mould parts 12 and 14 form a cavity 15 within which plastic preforms (not shown) are expanded into containers. Reference numeral 36 relates to a supply element which brings the base part 16 to the side parts 12 and 14 of the blow mould in working mode.

Reference numeral 30 indicates diagrammatically a fixing device which attaches the two blow mould halves together in a closed state for removal of the blow mould. For example these can be magnets of opposite polarity which hold the two blow mould halves together. To prevent the blow mould halves also being held together in working mode however, there are various conceivable possibilities. Thus for example one of the two magnets could be displaceable in relation to the other in a longitudinal direction L of the blow mould so that in working mode there is no magnetic force between the two blow mould parts 12 and 14. Furthermore it would also be possible for one or both magnets to be moved towards the inside in the radial direction R of the blow mould so that again in working mode a magnetic force between the two blow mould parts 12 and 14 is minimised or reduced to zero.

Furthermore it would also be possible for a multiplicity of alternately polarised magnets to be arranged in the longitudinal direction L in one of the two blow mould halves and furthermore a slider element can be provided which has magnetisable surfaces corresponding to the pitch of these magnets, wherein this element can be moved in the direction L in relation to the magnets. Depending on the position of the slider element, the surfaces either cover the magnets so that the magnetic force is transmitted or stand between the magnets so that the magnets are short-circuited and in this way the magnetic force is substantially reduced.

Thus, the fixing device here also comprises two magnets 31, 32, wherein magnet 31 is arranged on the first blow mould half 12 and the other magnet on the second blow mould half 14. Thus the two blow mould halves could have recesses in which the two magnets 31, 32 are arranged. Also just one magnet could be provided which attracts a magnetic section of the other blow mould half, respectively. The magnets could also be movable in a longitudinal direction L of the blow mould in order to release or form the magnetic attachment.

In addition however other (in particular mechanical) holding elements are conceivable which hold the two blow moulds parts 12, 14 together, such as for example mechanical locking bolts or similar with which the two blow mould halves can be coupled together as required. Such locking elements could also be controlled automatically, for example via a guide curve.

As stated, in a removal operation first the blow mould carrier 4 is detached from the blow mould 6 and then the blow mould as a whole can be removed from the machine. However removal in the longitudinal direction i.e. perpendicular to the plane of the figures would also be possible.

Figure 2:
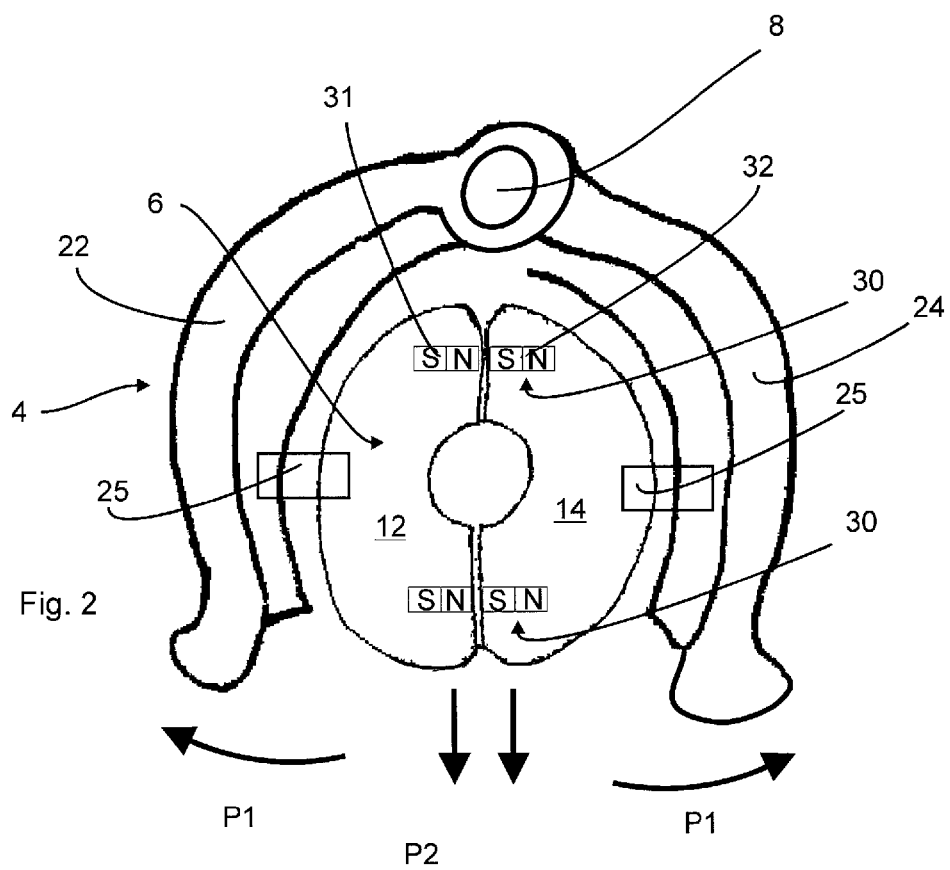
FIG. 2 shows a diagrammatic top view onto a blow mould carrier with a blow mould.

FIG. 2 shows a further view of a blow station according to the invention. Here too a situation is depicted in which the blow mould carriers 22 and 24 are partly opened and the blow mould itself arranged in a closed state. In this situation the blow mould in closed state can be removed along arrow P2 from the blow mould carrier, the two side parts 22 and 24 of which are swiveled out along arrow P1.

Furthermore it would also be possible to couple a locking mechanism, which attaches the two blow mould halves 12 and 14 to the carrier halves 22 and 24 respectively, with a locking mechanism of the two blow mould halves 12 and 14. Thus the coupling could be structured such that on unlocking of the blow mould halves 12 and 14 in relation to the carrier halves 22 and 24, at the same time a locking of the two blow mould halves 12 and 14 occurs.

Thus for removal of the blow mould or a change of mould parts, the device and handling could be structured such that the fitting time is reduced. This time-saving arises mainly from the common removal/insertion of the blow mould i.e. the two blow mould halves 12 and 14 and the base mould 16, so that only one procedure is required instead of the three different procedures as in the prior art.

In addition it is also possible for the blow mould to be stored together, instead of storing three individual parts of the blow mould as before. Due to this common storage, firstly less storage space is required but secondly the mould parts 12, 14 and 16 which belong together can be found quickly.

Thus for removal, first the two mould halves 12, 14 are released from the mould carrier 4 with the carrier closed. This as stated is a change from the present procedure. Only when the two mould halves have been released from the mould carrier are the two mould carriers 22 and 24 opened, wherein this opening can take place either manually or automatically.

Due to the said fixing device 30, the two blow mould halves 12 and 14 remain together, wherein as stated as well as the magnetic connection for example a snap connection can be considered. The mould carriers 22 and 24 have moved so far away from the mould halves 12 and 14 that the mould halves together stand freely on the base mould 16 (see FIG. 1). In some aspects, the mould halves 12 and 14 stand facing each other on the periphery of the base mould 16 and are fixed axially in order to guarantee a precisely positioned reinsertion. The mould change parts 12, 14 and 16 which are connected in this way stand freely for removal and can be removed and stored manually or fully automatically.

The mould sets to be used can be taken jointly from a corresponding magazine which is designed for all parts to be stored together, and thus time can be saved in searching.

The mould change parts 12, 14 and 16 which belong together can also be inserted in reverse order for mounting the blow mould 6. The base mould with the mould halves 12 and 14 fixed thereto is then positioned and in the next step the two mould carriers 22 and 24 close. Only in the final step are the blow mould halves 12 and 14 locked to the respective carrier halves 22 and 24 to implement the change in a state ready for operation.

Preferably it would also be possible to create the connection of the two mould halves 12 and 14 via the base part 16. Thus the two mould halves 12 and 14 could (where applicable) be locked on the base part 16 or directly locked together so that the mould carrier 4 detaches from the blow mould or its components 12 and 14 on opening.

Reference numeral 25 indicates diagrammatically a connecting mechanism via which the carrier parts 22, 24 are connected with the blow mould 6 or the blow mould halves. In some aspects this is a fully automatically releasable connecting mechanism which for example can be released or closed via a guide curve. This connecting mechanism may comprise several holding elements with which the blow mould parts are held on the carrier parts 22, 24. This connecting mechanism can also comprise magnetic holding elements. In addition the connection between the blow mould and the carrier parts can be generated by reduced pressure.

According to various aspects, together with the connecting mechanism, coolant connections can be applied to the blow mould 6 in order to supply this with in particular a liquid tempering agent or generally with a tempering agent. These connections could also be automatically releasable or connectable.

FIGS. 3a-3d show different stations for removal of a blow mould. In the situation shown in FIG. 3a, in one production mode a closed mould carrier 4 is shown with a blow mould 6 inserted therein. More precisely, the two blow mould parts 12 and 14 are firmly arranged on the corresponding carrier parts 22 and 24 so that when the two carrier halves 22 and 24 are folded apart, the blow mould parts 12 and 14 are also moved. Reference numeral 17 indicates an engagement area with which, when the two blow mould parts 12 and 14 are folded up, a base part 16 can also be connected. The base part 16 can be guided to the two mould parts 12 and 14 via a supply mechanism 19, wherein this supply mechanism 19 has a recess 21 in which again a correspondingly adapted protrusion 23 of the base part 16 engages.

Figure 3A:
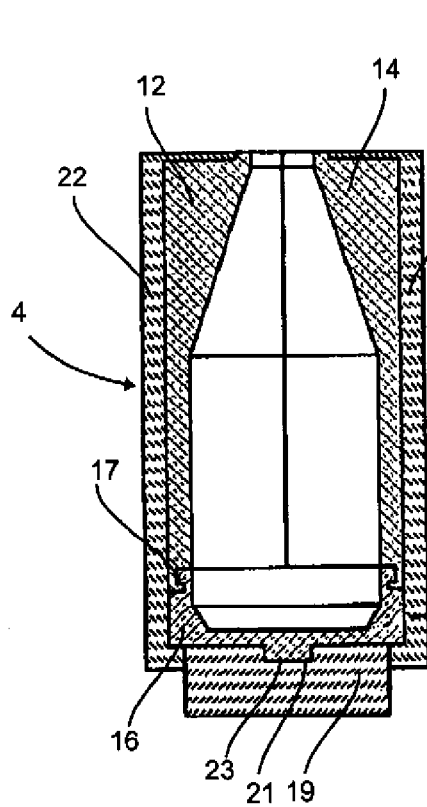
FIGS. 3a-3d show four views to illustrate a holding piece for a blow mould.
Figure 3B:
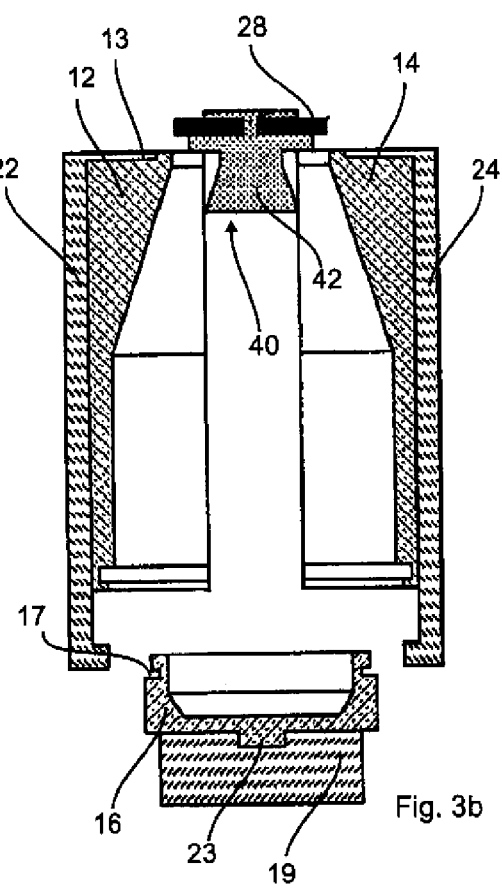

FIG. 3b shows an opened state of the two blow mould carriers 22 and 24 with the blow mould parts 12 and 14 locked therein. The reference numeral 13 relates to an engagement area by means of which the blow mould parts 12 and 14 are each locked to blow mould carriers 22 and 24. In this open state of the mould carrier 4 a holding element 40 can be brought into the inside of blow mould 6, wherein this holding element serves in particular to transport the blow mould 6. This holding element has an engagement section 42, the cross-section of which is greater than an opening cross-section of the blow mould 6 in closed state.

Figure 3C:
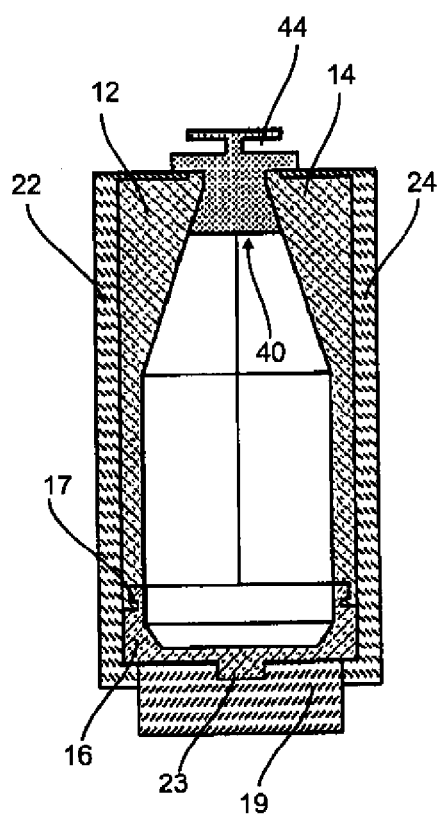
Figure 3D:
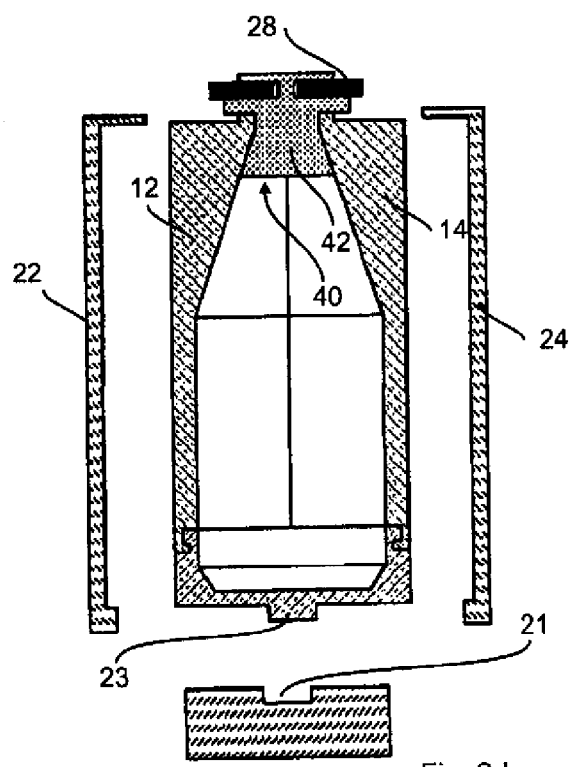

FIG. 3c shows a closed state with holding element 40 inserted. It is evident that the holding element 40 cannot be removed from the blow mould 6 because of its design or the engagement area 42. Rather, using this holding element the blow mould 6 can be transported. In the situation shown in FIG. 3d the carrier was opened as shown in FIG. 2 so that now the blow mould 6 together with the mould parts 12 and 14 and base part 16 can be removed using the holding element 40. To this end the holding element has recesses 44 (see FIG. 3c) in which a gripper device or gripper clamp 28 can engage, which in normal operation of the plant also serves to transport the containers. This gripper device can transport the blow mould (where applicable also via the usual transport routes in normal operation) for example to a magazine. Furthermore in this way the blow mould can be transported to a cleaning station in which where applicable automatic cleaning of the blow mould is possible.

Thus the individual movements which serve for insertion of the holding element 40 or for transporting of the blow mould can be derived from one movement in the normal working mode of the plant.

In a procedure not shown in the figures, the holding piece or dummy with the mould halves 12 and 14 and base mould 16 is placed pre-oriented on an input star. Furthermore on input the blow mould 6 can be oriented and thus brought into the mould carrier 4 turned to a preset angle, for example 20°. In this embodiment the holder piece is connected with the blow mould in a rotationally stationary manner for at least part of the time.

In some aspects, in a further step the holder piece is turned for example via a toothed rod until the blow mould parts 12 and 14 and base part 16 engage in the blow mould carrier. In a further step the water connections for the blow mould parts and the base part 16 can be locked, preferably by curve control. Finally the blow mould 6 can be opened and the holder piece 40 removed for example via an output star.

Thus the holding element here performs the task of holding the two mould halves 12 and 14 and the base so that the entire blow mould 6 or at least the two blow mould halves 12 and 14 can be removed in one movement from the opened mould carrier 4. In a possible embodiment of the holding element 40, this is introduced into the closing mould via a transfer arm, where this can even be the input star of the machine. On closing of the two blow mould halves, these as shown in FIG. 3b engage in the holding element 40. On further turning of the blow machine, the blow moulds 6 are detached from the blow mould carrier 4. As stated above, this can take place for example by locking under curve control. Also where applicable any existing water connections can be decoupled via curves.

On subsequent opening of the mould carrier 4, the blow mould halves 12 and 14 locked on the holding element 40 remain closed and the holding element together with the blow mould 6 can be removed for example by a transfer arm, where the transfer arm can also be the output star of the plant. Then the entire blow mould 6 together with the holding element 40 can be placed in a magazine on this holding element.

Figure 4A:
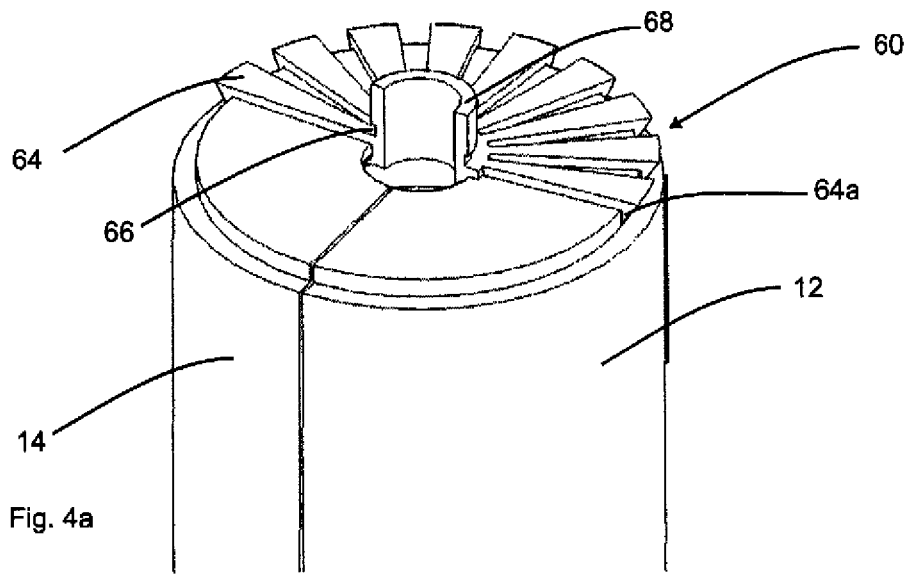
FIGS. 4a-4c show three views to illustrate a further holding piece for a blow mould.
Figure 4B:
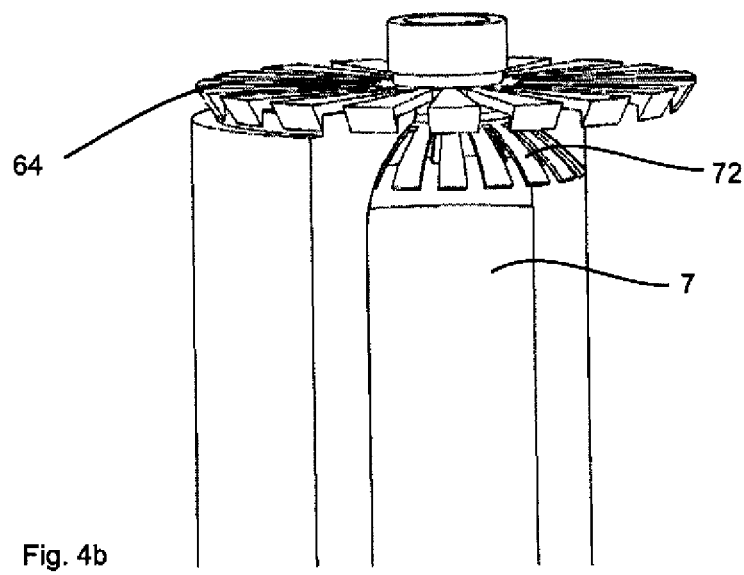
Figure 4C:
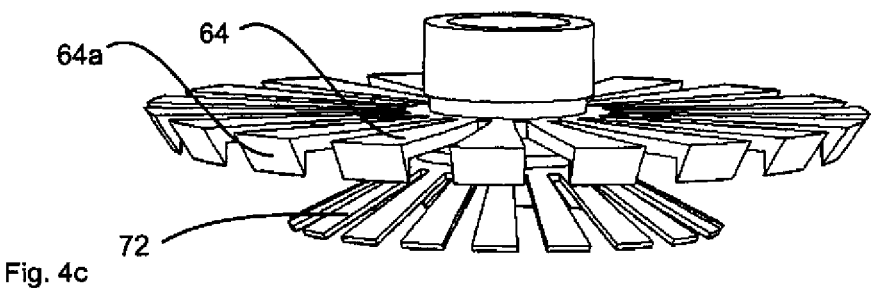

FIGS. 4a to 4c show a further embodiment of a holding piece 60 which grips the blow mould from the outside. Thus for example the holding piece 60 in the form of a plastic clip could be moved with the input star into an open mould. This holding piece has a multiplicity of holding webs 64 or clips extending in the radial direction of the blow mould. These holding webs are each arranged on a base body 68. This base body has firstly a peripheral groove 66 in which a gripping clamp can engage. In addition the base body can however have a further opening so that other gripper elements, such as for example holding mandrels, can engage therein. Reference numeral 64a relates to holding hooks which engages in an outer periphery of the blow mould parts 12, 14, wherein to this end the blow mould can for example comprise a peripheral groove.

As evident from FIG. 4b, the holding piece also has lower support webs 72 which with the blow mould closed are arranged in the inside thereof and which rest against the inner wall 7 of the blow mould 6. When the mould closes, clips or their hooks 64a can reach over the mould and prevent a scraping of the lock by the inner arms or support webs, which for example lie on the bottle contour and thus draw the holding element 60 down. Dismantling is possible by pulling up or raising the said clips.

Figure 5:
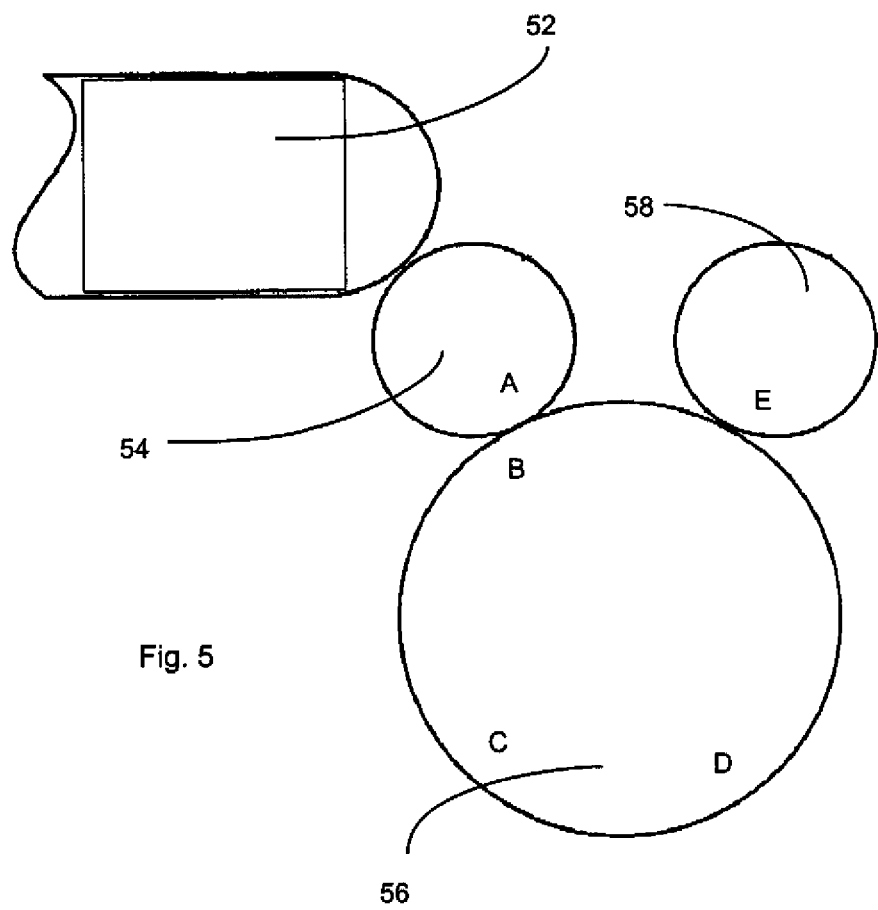
FIG. 5 shows a rough diagrammatic view of a plant for processing containers according to the various aspects of the disclosure.

FIG. 5 illustrates the method according to the invention. Reference numeral 52 indicates a heating device for heating the preforms, numeral 54 an input star, numeral 56 a blower wheel on which can be arranged a multiplicity of blow stations of the type shown in FIG. 1, and numeral 58 an output star. The holding element as explained above can be attached in area A and in position B, already on the blowing wheel of this holder element, engage in the blow mould 6. In area C the water connections can be decoupled and in area D the blow mould 6 released from the blow mould carrier 4. In an area E it would be possible to remove the holding element 40 together with the blow mould.

On insertion of a new mould, the principle explained can be reversed. Thus in area A, a holding element with a pre-oriented mould can be fitted. In area B the mould can be oriented. In area C the mould can be attached to a carrier, in area D the water connections can be coupled and in area E, with the carrier opened, the holding element 40 removed. Here again it is possible to introduce the blow mould 4 via a transfer arm. Precise orientation of the blow mould can take place while the mould carrier halves are closing. For example such an orientation is possible via lugs on the mould carrier 4. With the mould closed both water connections can be connected and the mould fixed in the mould carrier 4, wherein as stated again this can proceed via curves provided. On opening of the blow mould halves 12 and 14, the holding element 40 is disengaged and removed by an output star 58.

It will be apparent to those skilled in the art that various modifications and variations can be made to the method and device for installing and/or removing blow moulds of the present disclosure without departing from the scope of the invention. Other embodiments of the invention will be apparent to those skilled in the art from consideration of the specification and practice of the invention disclosed herein. It is intended that the specification and examples be considered as exemplary only.

What is claimed is:

1. Method for removal of blow moulds from a moulding device for transforming plastic preforms into plastic containers, the method comprising:
   providing a moulding device comprising at least one blow mould carrier and a multi-piece blow mould arranged on the blow mould carrier, the multi-piece blow mould comprising at least two parts coupled together in at least a partially assembled state, wherein the partially assembled state means that at least two parts of the multi-piece blow mould are substantially joined together; and
   separating the blow mould, with the multi-piece blow mould in the at least a partly assembled state, from the blow mould carrier, wherein separating the blow mould comprises separating the blow mold from the at least one blow mould carrier, then removing the blow mould from a forming device in the at least partially assembled state.

2. Method according to claim 1, wherein the blow mould carrier is in direct contact with the multi-piece blow mould and not in direct contact with the plastic preforms.

3. Method according to claim 1, wherein the blow mould comprises two blow mould halves, and the blow mould halves are attached together with a holding means while the blow mould is removed from the blow mould carrier.

4. Method according to claim 1, wherein the blow mould has a base part, and the base part is attached to at least one of the blow mould halves while the blow mould is separated from the blow mould carrier.

5. Method according to claim 4, wherein the blow mould halves are locked to the base part such that the blow mould carrier detaches from the blow mould halves on opening.

6. Method according to claim 1, further comprising, after separation of the blow mould from the blow mould carrier, transporting the blow mould by means of a transport device.

7. Method according to claim 6, wherein the blow mould is transported on a holder element which serves to transport the containers.

8. Forming device for transforming plastic preforms into plastic containers with a multipiece blow mould that forms a cavity within which the plastic preforms can be expanded into plastic containers, the forming device comprising:
   a blow mould carrier on which the blow mould is releasably arranged; and
   a holding arrangement structured and arranged to attach at least two parts of the blow mould together in at least a partially assembled state when the blow mould is detached from the blow mould carrier, wherein the partially assembled state means that at least two parts of the blow mould are substantially joined together.

9. Forming device according to claim 8, wherein the blow mould carrier is connected with the blow mould via an automatically releasable connecting mechanism.

10. Forming device according to claim 8, wherein the two parts of the blow mould are attached together directly with the holding means.

11. Forming device according to claim 8, wherein the blow mould is attachable to a holding element, which in a working mode serves to transport the containers.

12. Forming device according to claim 8, further comprising a holding piece movable into connection both with the blow mould and with a holding element, the holding piece in working mode configured to transport the containers.

13. Forming device according to claim 12, wherein the holding piece is movable into engagement with two parts of the blow mould to hold the blow mould.

14. Blow mould for transforming plastic preforms into plastic containers, the blow mould comprising:
   a first side part and a second side part, the first side part and the second side part in assembled state delimit a cavity within which plastic preforms can be expanded into plastic containers; and
   a connecting device attaching the first side part to the second side part, the connecting device including a first connecting element connected with the first side part and a second connecting element connected with the second side part such that the blow mould can be transported in a closed state.

15. Blow mould according to claim 14, wherein the first side part and the second side part are attached together while the blow mould is removed from a blow mould carrier.

16. Blow mould according to claim 14, further comprising a base part, the base part being attached to at least one of the first side part and the second side part while the blow mould is separated from a blow mould carrier.

17. Blow mould according to claim 16, wherein the first side part and the second side part are locked to the base part such that the blow mould carrier detaches from the first and second side parts on opening.

18. Forming device according to claim 8, further comprising a base part, the base part being attached to at least one of the at least two parts of the blow mould while the blow mould is separated from a blow mould carrier.

19. Forming device according to claim 18, wherein the at least two parts of the blow mould are locked to the base part such that the blow mould carrier detaches from the at least two parts on opening.

20. Forming device according to claim 8, further comprising a transport device for transporting the blow mould after separation of the blow mould from the blow mould carrier.

21. Method for removal of blow moulds from a moulding device for transforming plastic preforms into plastic containers, the method comprising:
   providing a moulding device comprising at least one blow mould carrier and a multi-piece blow mould arranged on the blow mould carrier, the multi-piece blow mould comprising at least two parts coupled together in at least a partially assembled state; and
   separating the blow mould, with the multi-piece blow mould in said at least a partly assembled state, from the blow mould carrier, wherein the blow mould has a base part attached to at least one blow mould half while the blow mould is separated from the blow mould carrier.

* * * * *